3,361,131
READER FOR USE IN CORRECTING A VISUAL HANDICAP
William Calvin Barger, Great Neck, N.Y. (1325 Orange Isle, Fort Lauderdale, Fla. 33315)
Filed May 29, 1963, Ser. No. 292,178
2 Claims. (Cl. 128—76.5)

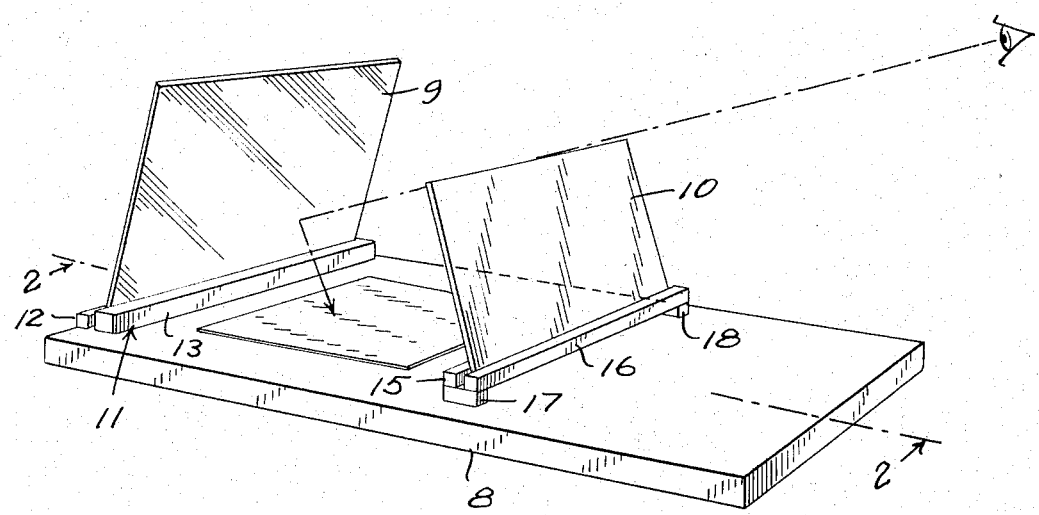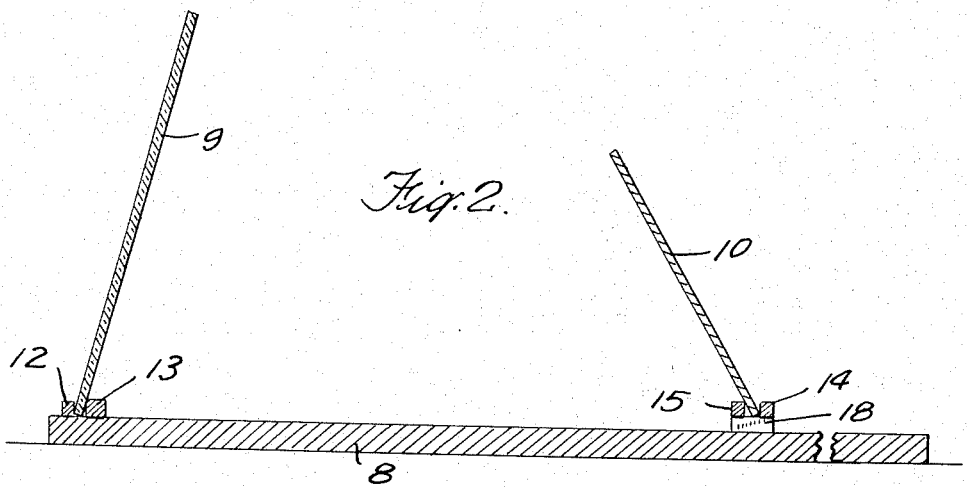

This application is a continuation-in-part of my co-pending application Ser. No. 714,148, now abandoned.

This invention relates to a reading assistance device for use by individuals having visually perceptual handicaps. The invention more particularly is that of apparatus serving to invert letters and other types of characters in reading matter for those who are unable perceptually to perform this function themselves.

It is well known that the language arts symbols (i.e. literary, scientific e.g. mathematical, musical, etc.) make an inverted impression on the retina of the human eye. It is, therefore, necessary for the brain to adjust and correct such inverted images so that such symbols are perceived realistically. There are those, however, who are not readily capable of orienting and adjusting in the appropriate brain areas the images of such symbols established on the retina, and for whom such inability has sorely handicapped their reading ability.

Some attempts have been made to devise aids for these afflicted persons. However, the devices tried have not appeared to be capable of practical acceptance because their either awkwardly arranged parts or complicated construction made them difficult to employ and to carry about, or because they lacked practical adaptability and, hence, were not suitable for the various users.

The devices embodying the instant invention not only avoid and lack these various disadvantages, but also are particularly readily acceptable by their simplicity and ready convenience and suitability for general use by children as well as by adults.

Generally, the invention provides an image inverting reading aid, comprising a flat base for supporting reading matter laid down on it, a mirror, and a shield (i.e. opaque barrier) physically spaced away from the mirror and adapted to obstruct the direct viewing of the reading matter from the user. Affixed to the base are longitudinally substantially parallelly spaced apart separate holders for supporting the mirror and the shield respectively and directly from the base. These holders are constructed and arranged to enable the mirror and the shield respectively separately directly to be set and held at a suitably effective angle for the user within a range conceived to be generally useful for different individuals.

In addition, these holders enable the mirror and shield to be taken down when no longer needed and to be disposed in relation to the base and the holders in such a way as to render the device conveniently compacted and easily portable. Thus, an advantageous feature of the embodiment of the invention, is that these holders enable complete removal of the mirror and also of the shield from their respective supporting elements so that they can be placed flat against one another and easily be slipped under the supporting elements for the shield and against those for the mirror for their joint disposal flat against the body of the base. That then assures easy dismantling and compact arrangement of the parts for convenient carriage of the device. The entire device is of quite simple and inexpensive design and yet affords utility by any individual required to use it.

A more complete understanding of the invention is had from the following detailed description made in relation to the illustrative embodiment shown in the accompanying drawings, in which:

FIG. 1 is a perspective view of the device of the invention; and

FIG. 2 is a longitudinal vertical section taken on line 2—2 of FIG. 1.

FIG. 3 is an enlarged fragmentary longitudinal vertical section similar to that taken on the line 2—2 of FIG. 1, but relating to the modified embodiment described in the second paragraph preceding the last paragraph of this specification.

In the embodiment of the invention as shown in the drawings, the reading aid device comprises a base 8 on which a mirror 9 and opaque shield 10 are removably supported. The mirror holder 11 consists in its simplest embodiment of merely two parallel and transversely spaced apart slat-like members 12 and 13 flatly disposed on and affixed to the base 8. The spacing of the members 12 and 13 is such as to hold the mirror when supported between them to incline toward the shield at an angle of from about 65 to about 75 degrees (to base 8). At that inclination it is best adapted to receive an image of the reading matter placed on the base 8 between the mirror and the shield and thus generally effective for its various users.

Holder 14 for shield 10 similarly comprises a pair of horizontally spaced apart and transversely disposed (as to the base) slat-like members 15 and 16, the opposed outer ends of both of which are supported above base 8 on small blocks 17 and 18 secured to the base. Shield 10 is designed for its bottom edge to be inserted between the members 15 and 16 and with the outer ends of that edge supported on the blocks 17 and 18 (as seen in FIGS. 1 and 2). Blocks 17 and 18 should be (a) at least high enough to enable the mirror and shield when placed flatly on top of one another to be slid under the horizontal members 15 and 16, and (b) far enough apart for the mirror and shield to fit between them.

These means for holding the mirror and the shield allow these components to be set at suitable reading angles within a range, while permitting their easy removal and replacement. Slat-like members 15 and 16 are spaced apart from each other a small distance sufficient to support the shield, merely by having its lower end placed between them and on blocks 17 and 18 inclined toward the mirror at an angle of from about 55 to about 80 degrees to the base. The angle of the mirror and of the shield respectively to the base within their respective ranges makes the device effective for general use.

Shield 10 can be made of a good clean grade of paper board, for example, three-ply Bristol board, or can be a sheet of opaque plastic or metal of similar thickness.

Inclusive, as in FIG. 3, of one or several parallel, vertically spaced apart horizontal notches 19 and 20 in the vertical wall of shield support member 16a which faces member 15, presenting a saw-tooth vertically transverse cross-section with the teeth directed toward member 15, enables adjusting the angle of shield 10 within its range by setting its lower edge in the particular one of those notches, which enables holding shield 10 at the required angle within its range. Member 16a can be made of such height to enable having the selected number of such shield 10 angle-adjustment notches in its wall which faces member 15.

In using the device, the height to which the bottom edge of shield 10 is elevated above base 8 provides a space between the bottom edge of the shield and the base, which permits slipping the reading matter under the shield thereby to place it on the base between the mirror and the shield, so that the user can slide the reading matter away from himself and under the shield to a position where it can be easily seen in the mirror and yet be obstructed by the shield from the user's direct view.

Various other modifications in the embodiments of the invention herein described may be effected by persons skilled in the art without departing from the scope and principle of the invention as defined in the appended claims.

What is claimed is:

1. A reading aid device effective for use by, and in working with, one with visual perceptual handicap, which device comprises a flat base for supporting flately thereon matter to be read;

an unattached mirror to be supported with its lower end nearer one end of a flat surface of said base and serving as its working surface;

a pair of substantially parallel slat-like members horizontally attached to said working surface transversely to its length for holding said mirror speccifically inclined toward the other end of said base, said slat members being horizontally spaced apart a small distance greater than the mirror thickness sufficient to support the mirror at an angle of from about 65 to about 75 degrees to said base merely by having its lower end placed between said slat members;

an unattached opaque planar shield for shielding from view of the user reading matter placed between it and the mirror when the user is seated in front of the shield and looking past its top edge into the mirror; and shield-hoidlng means comprising a second pair of substantially parallel slat-like members horizontally spaced away from one another a small distance greater than the shield thickness sufficient to support said shield, merely by having its lower end placed between its said slat-like members, at an angle of from about 55 to about 80 degrees to said base inclined toward the mirror, said second pair of slat-like members having each one of their respective pairs of opposed outer ends supported on and attached to its own respective end block attached to the working surface of the base whereby the shield can be supported raised from said surface merely by having the outer end portions of its lower end resting on said end blcoks between said spaced apart slat-like members; the distance between both end blocks being greater than the height of which ever of the mirror and the shield is the taller of them, and the height of the end blocks being at least enough for enabling the mirror and shield when placed flatwise on top of one another to be slid readily under the second pair of slat-like members;

both pairs of slat-like members being horizontally substantially parallel to, and so spaced away from, one another by a distance sufficient to allow reading material to lie face up flat on the working surface of the base and between the miror-holding and shield-holding means.

2. A reading aid device effective for use by, and in working with, one with visual perceptual handicap, which device comprises a flat base for supporting flatly thereon matter to be read;

an unattached mirror to be supported with its lower end nearer one end of a flat surface of said base and serving as its working surface;

a pair of substantially parallel slat-like members horizontally attached to said working surface transversely to its length for holding said mirror specifically inclined toward the other end of said base, said slat members being horizontally spaced apart a small distance greater than the mirror thickness sufficient to support the mirror at an angle of from about 65 to about 75 degrees to said base, merely by having its lower end placed between said slat members;

an unattached opaque planar shield for shielding from view of the user reading matter placed between it and the mirror when the user is seated in front of the shield and looking past its top edge into the mirror; and shield-holding means comprising a second pair of substantially parallel slat-like members horizontally spaced away from one another a small distance greater than the shield thickness sufficient to support said shield, merely by having its lower end placed between its said slat-like members, at an angle of from about 55 to about 80 degrees to said base and inclined toward the mirror, said second pair of slat-like members having each one of their respective pairs of opposed outer ends supported on and attached to its own respective end block attached to the working surface of the base whereby the shield can be supported raised from said surface merely by having the outer end portions of its lower end resting on said end blocks between said spaced apart slat-like members; the one of the pair of slat-like members of the shield-holding means, which is farther removed from the other pair of parallel slat-like members, having along its inner vertical wall and parallel to and vertically spaced apart from its lower edge at least one, horizontal shield-angle-adjustment notch to enable the lower end of the shield selectively to be held at a selected one of more than one elevation above the working surface of the flat base of the device, thereby to enable the shield selectively to be positioned at a selected specific one of a number of different angles to said base; the distance between both end blocks being greater than the height of whichever of the mirror and the shield is the taller of them, and the height of the end blocks being at least enough for enabling the mirror and shield when placed flatwise on top of one another to be slid readily under the second pair of slat-like members;

both pairs of slat-like members being horizontally substantially parallel to, and so spaced away from, one another by a distance sufficient to allow reading material to lie face up flat on the working surface of the base and between the mirror-holding and shield-holding means.

References Cited

UNITED STATES PATENTS

| | | | |
|---|---|---|---|
| 1,105,835 | 8/1914 | Radley | 40—152.1 |
| 2,902,295 | 9/1959 | Slaubaugh | 120—28 |

FOREIGN PATENTS

| | | |
|---|---|---|
| 630,357 | 5/1936 | Germany. |
| 582,775 | 11/1946 | Great Britain. |

JEWELL H. PEDERSEN, *Primary Examiner.*

R. J. STERN, *Assistant Examiner.*